United States Patent [19]

Dean et al.

[11] Patent Number: 5,555,332

[45] Date of Patent: Sep. 10, 1996

[54] APPLICATOR AND ASSOCIATED METHOD FOR INSERTING GUIDE PINS IN A FIBER OPTIC CONNECTOR

[75] Inventors: David L. Dean, Hickory; Alan J. Malanowski, Newton; James R. Merriken, Hudson; Otto I. Szentesi, Hickory, all of N.C.

[73] Assignee: Siecor Corporation, Hickory, N.C.

[21] Appl. No.: 487,765

[22] Filed: Jun. 8, 1995

[51] Int. Cl.⁶ .................................................. G02B 6/38
[52] U.S. Cl. ................................ 385/53; 385/59; 385/71
[58] Field of Search ............................... 385/53, 59, 52, 385/71, 77, 137, 139

[56] References Cited

U.S. PATENT DOCUMENTS

| | | | |
|---|---|---|---|
| 4,385,801 | 5/1983 | Bubanko | 385/59 |
| 4,597,631 | 7/1986 | Flores | 385/53 |
| 4,856,863 | 8/1989 | Sampsell et al. | 385/53 X |
| 5,214,730 | 5/1993 | Nagasawa et al. | 385/59 |

OTHER PUBLICATIONS

Y. Kikuchi et al., High Fiber Count Optical Connectors, International Wire & Cable Symposium Proceedings 1993, Mar.

Toshiaki Satake, et al., U.S. Conec Spreads MT Connector into North American Markets, NTT Review, vol. 5 No. 4, Jul., 1993.

Tadashi Haibara, et al., High Speed, Low–Loss Connection Techniques for High–Count Pre–Connectorized Cables; International Wire & Cable Symposium Proceedings 1991 No Month.

Y. Kikuchi, et al., High Fiber Count Push–on Pull–off Connector; International Wire & Cable Symposium Proceedings 1994/Nov.

Hiroyuki Yanagase, et al., 80–Fiber Connector, International Wire & Cable Symposium Proceedings 1994 Nov.

Toshiaki Satake, et al., A New Type of Demountable Plastic–Molded Single–Mode Multifiber Connector, Journal of Lightwave Technology, vol. LT–4, No. 8, Aug., 1986.

Toshiaki Satake, et al., Loss Analysis of a Single–Mode 5–Fiber Plastic Connector; The Transactions of the IECE of Japan, vol. E69, No. 3 Feb. 1988.

Toshiaki Satake, et al.; Very Small Single–Mode Ten–Fiber Connector; Journal of Lightwave Technology, vol. 6, No. 2, Feb. 1988.

F. Ashiya and T. Satake, Development of Multifibre Connectors and their Application; E–FOC91 No Month (1991).

Izumi Sankawa, et al., Methods for Reducing Optical Fiber Connector Reflection through Use of Index Matching Materials; Review of the Electrical Communications Laboratories vol. 34, No. 6, 1986 No Month.

S. Nagasawa, et al., A High–Performance Single–Mode Multifiber Connector Using Oblique and Direct Endface Contact Between Multiple Fibers Arranged in a Plastic Ferrule; IEEE Photonics Technology Letters, vol. 3, No. 10, Oct. 1991.

Y. Nomura, et al., Push–on Pull–off Mult–Fiber Connector; International Wire & Cable Symposium Proceedings 1992 No Month.

(List continued on next page.)

*Primary Examiner*—John D. Lee
*Assistant Examiner*—Phan T. H. Palmer
*Attorney, Agent, or Firm*—Wesley T. Noah

[57] ABSTRACT

An applicator for inserting guide pins in the corresponding apertures of a fiber optic connector includes a carrier body defining a number of bores and a number of guide pins disposed at least partially within respective ones of the bores, the guide pins extending outwardly from a first surface of the carrier body. The outwardly extending ends of the guide pins are then inserted into and captured by the fiber optic connector and remain therein after removal of the carrier body. In order to further increase the numbers of guide pins that are simultaneously inserted, a plurality of fiber optic connectors can be maintained in a predetermined aligned relationship by an alignment shell having a releasably connected sidewall for receiving the fiber optic connectors.

25 Claims, 3 Drawing Sheets

OTHER PUBLICATIONS

Y. Yamada, Low–Loss and Stable Fiber–to Waveguide Connection Utilizing UV Curable Adhesive; IEEE Photonics Technology Letters, vol. 4, No. 8, Aug. 1992.

T. Ohta, et al., Low Loss Single–Mode Multi–Fiber Plastic Connector; International Wire & Cable Symposium Proceedings 1989 No Month.

S. Nagasawa, et al., A Single–Mode Multifiber Push–On Type Connector With Low Insertion And High Return Losses; ECOC/IOOC '91 No Month (1991).

Tomomi Sano, et al., Development of Anti–Reflection Film On Multiple Fiber Connector; Fourth Optoelectronics Conference (Jul. (1992).

Y. Tamaki, et al., MT–type Fiber Selector for Optical Fiber Monitoring System, International Wire & Cable Symposium Proceedings (1992) No Month.

S. Nagasawa, et al., Single–Mode Multifiber Connectors for Future Large Scale Subscriber Networks, ECOC '93 Montreux/Switzerland; 12–16 Sep. 1993; 19th European Conference on Optical Communication.

Yamakawa, et al., 16–Fiber Optical Connector; International Wire & Cable Symposium Proceedings 1993. No Month.

Ueda, et al., Development of 16–Fiber Connectors For High–Speed Low–Loss Cable Connection; International Wire & Cable Symposium Proceedings 1993 No Month.

Tomita, et al., Ultra High–Density Optical Fiber Cable with Thin Coated Fibers and Multi–Fiber Connectors; International Wire & Cable Symposium Proceedings 1993 No Month.

APPLICATOR AND ASSOCIATED METHOD FOR INSERTING GUIDE PINS IN A FIBER OPTIC CONNECTOR

FIELD OF THE INVENTION

The present invention relates generally to fiber optic connectors and, more particularly, to fiber optic connectors having a plurality of guide pins for maintaining a predetermined aligned relationship with other fiber optic connectors.

BACKGROUND OF THE INVENTION

Fiber optic connectors are commonly employed to align and to interconnect one or more optical fibers with a variety of optical devices or with other optical fibers. For example, first and second fiber optic connectors can be mounted on respective end portions of a pair of fiber optic cables, such as first and second fiber optic ribbon cables which each include a number of individual optical fibers. The fiber optic connectors can then be interconnected in a predetermined aligned relationship.

In order to efficiently transmit signals between the optical fibers of the pair of fiber optic cables, the fiber optic connectors must precisely align the individual optical fibers such that the optical signals transmitted therethrough are efficiently coupled from fiber to fiber. In addition, the fiber optic connectors must precisely align the individual optical fibers in a predetermined manner such that the fiber optic connectors can be readily mated with other fiber optic connectors.

The use of fiber optic connectors continues to increase as the demand for the bandwidth, quality and reliability of optical fiber transmission expands. For example, there is an increasing demand to install optical fibers, not just as trunk and distribution lines along which signals are transmitted relatively long distances within a communications system, but also directly to the home, such as in a Fiber To The Home (FTTH) system. Accordingly, a variety of standardized fiber optic connectors have been developed which are widely used in the optical fiber industry.

For example, MT and MF fiber optic connectors have been developed, one embodiment of which is illustrated and described in U.S. Pat. No. 5,214,730 which issued May 25, 1993 to Shinji Nagasawa et al. and is assigned to Nippon Telegraph and Telephone Corporation. As illustrated in the Nagasawa '730 patent, the fiber optic connector receives a fiber optic ribbon cable having a plurality of individual optical fibers and maintains the individual optical fibers in a predetermined aligned relationship. Accordingly, the fiber optic connector can be mated with a corresponding fiber optic connector so as to align the plurality of individual optical fibers of the fiber optic connector with the plurality of optical fibers of the fiber optic cable received by the corresponding fiber optic connector.

In order to maintain the fiber optic connectors of the Nagasawa '730 patent in a predetermined aligned relationship, each of the fiber optic connectors include a pair of laterally opposed bores. As described in the Nagasawa '730 patent, guide pins can be disposed within the bores of a first fiber optic connector such that a portion of the guide pins extend outwardly from the front surface of the fiber optic connector. During the connection process, the outwardly extending portions of the guide pins can be inserted within respective apertures defined by a second fiber optic connector such that the first and second fiber optic connectors are maintained in a predetermined aligned relationship.

Even though fiber optic connectors, such as the MT and MF fiber optic connectors, permit the simultaneous alignment and connection of a plurality of optical fibers, such as 4, 8 or 12 optical fibers, the connectors must be prepared according to a relatively time-consuming process prior to interconnecting the fiber optic connectors. In particular, the end faces of both fiber optic connectors must generally be cleaned, such as with alcohol which can be dabbed on the end face of the fiber optic connectors with a swab. The end faces of the fiber optic connectors are then dried, for example, with an aerosol duster or filtered compressed air. Once dry, guide pins are individually inserted in respective apertures defined by a first fiber optic connector. Due to the relatively small size of the fiber optic connectors and the associated guide pins (the guide pins typically have a diameter of approximately 0.7 millimeters), it can be relatively difficult to grasp and insert the guide pins within the respective apertures which are defined at precise locations by the first fiber optic connector.

Once the guide pins have been inserted, index matching gel is generally applied to the end face of one of the fiber optic connectors. More typically, the index matching gel is applied to the end face of the second fiber optic connector which has not received the guide pins. For example, the index matching gel can be applied to the end face of the second fiber optic connector by dabbing index matching gel on the end face with a swab or a toothpick or by applying a relatively small amount of index matching gel to the end face with a syringe. Thereafter, the first and second fiber optic connectors can be mated by inserting the guide pins which extend outwardly from the first fiber optic connector into respective apertures defined by the second fiber optic connector such that the first and second fiber optic connectors are maintained in a predetermined aligned relationship. Finally, a spring fastener can be installed over the first and second fiber optic connectors to apply a compressive force to the fiber optic connectors, thereby maintaining the first and second fiber optic connectors in the predetermined aligned relationship.

While the connector preparation process described above generally provides reliable mating of the first and second fiber optic connectors, the connector preparation process is relatively time consuming. In particular, the technician preparing the fiber optic connectors must meticulously perform each of the steps in the prescribed order in order to effectively mate the fiber optic connectors.

In addition, in order to properly couple the signals from fiber to fiber, the technician must apply a predetermined amount of index matching gel to the end face of one of the fiber optic connectors since the application of too much index matching gel may make the connection process unnecessarily messy, respectively. However, it is relatively difficult to apply the predetermined amount of index matching gel to the fiber optic connector with a swab, toothpick or syringe as described above.

Furthermore, in order to more efficiently align and connect even larger numbers of optical fibers, connector assemblies have been developed in which a predetermined number of fiber optic connectors, such as five fiber optic connectors, are stacked so as to be simultaneously interconnected with another connector assembly having the same number of fiber optic connectors stacked in a similar fashion. For example, an 80-fiber connector is described in an article entitled "80-Fiber Connector" by Hiroyuki Yanagase et al. which is published in the Int'l Wire and Cable Symposium Proceedings, pp. 614–19 (1994). The 80 fiber connector includes five 16-fiber connectors which are stacked in an aligned relationship. The stacked connectors are maintained in the stacked relationship by inserting binding pins through vertically-disposed apertures defined through each of the individual fiber optic connectors. Thereafter, a first 80-fiber connector comprised of five individual fiber optic connectors can be mated with a second 80-fiber connector which is also comprised of five stacked fiber optic connectors.

While connector assemblies comprised of a plurality of stacked fiber optic connecters provide for the simultaneous alignment and connection of even larger numbers of optical fibers, each of the individual fiber optic connectors of the connector assemblies must be cleaned and prepared in the manner described above. In addition, connector assemblies, such as the 80-fiber connector described above, generally include a larger number of guide pins. Typically, each individual fiber optic connector of each connector assembly is adapted to receive two guide pins. Thus, a much greater number of guide pins must generally be individually inserted by a technician during the connector preparation process. Further, a predetermined amount of index matching gel must also be applied to the end face of each of the individual fiber optic connectors to prevent undesirable reflections. However, as described above, the application of the predetermined amount of index matching gel can be relatively difficult to carry out consistently. Accordingly, while a greater number of individual optical fibers are simultaneously aligned and connected by such connector assemblies, the connector preparation process is still relatively time consuming and continues to require significant attention to detail by the assembling technician.

SUMMARY OF THE INVENTION

It is therefore an object of the present invention to provide a more efficient method of connecting a pair of fiber optic connectors in a predetermined aligned relationship.

It is another object of the present invention to provide an improved apparatus for inserting the guide pins in the corresponding apertures of a fiber optic connector.

It is yet another object of the present invention to provide an improved applicator for applying a predetermined amount of index matching gel to a fiber optic connector.

It is a further object of the present invention to provide an improved apparatus for maintaining the plurality of fiber optic connectors of a connector assembly in a predetermined aligned relationship.

These and other objects are provided, according to the present invention, by an applicator and an associated method for inserting a plurality of guide pins in the corresponding apertures of a fiber optic connector and by an alignment shell for maintaining a plurality of fiber optic connectors of a connector assembly in a predetermined aligned relationship. Accordingly, fiber optic connectors can be more efficiently prepared and connected in a predetermined aligned relationship.

The applicator of the present invention includes a carrier body defining a plurality of bores opening through a first surface of the carrier body. The applicator also includes a plurality of guide pins disposed at least partially within respective ones of the plurality of bores and extending outwardly from the first surface of the carrier body. In particular, each guide pin preferably extends from a first end which projects outwardly from the first surface of the carrier body to a second end disposed within a respective bore defined by the carrier body.

According to one embodiment, the applicator includes means for releasably retaining the plurality of guide pins within respective ones of the bores prior to inserting the plurality of guide pins within respective ones of the apertures of the fiber optic connector. In order to effectively transfer the guide pins from the applicator to the fiber optic connector, the retaining means provides a predetermined retention force to the plurality of guide pins. The predetermined retention force is preferably less than the force with which the plurality of guide pins are captured by the fiber optic connector upon insertion of the plurality of guide pins into respective ones of the apertures of the fiber optic connector. Accordingly, the plurality of guide pins will be transferred from the applicator to the fiber optic connector upon the insertion of the plurality of guide pins within respective ones of the apertures of the fiber optic connector.

The guide pins of one embodiment can be comprised of a ferromagnetic material. Accordingly, the retaining means can include a magnet for retaining the plurality of ferromagnetic guide pins within respective ones of the plurality of bores. According to another embodiment, the retaining means can include an elastic member extending about the respective second ends of the plurality of guide pins to thereby retain the plurality of guide pins within respective ones of the plurality of bores defined by the carrier body. According to yet another embodiment, the retaining means can include means for frictionally engaging the plurality of guide pins. According to a more specific embodiment, the frictional engaging means can include a plurality of ribs extending inwardly into respective ones of the plurality of bores defined by the carrier body to thereby frictionally engage and retain the plurality of guide pins.

According to another embodiment, the applicator of the present invention includes index matching gel provided to the first surface of the carrier body such that the index matching gel is at least partially transferred to the fiber optic connector as the guide pins are inserted within respective ones of the apertures of the fiber optic connector. The carrier body of this embodiment can also include at least one rib extending outwardly from the first surface of the carrier body to minimize contact between the carrier body and the fiber optic connector while inserting the guide pins therein. The at least one rib also defines and separates the first surface of the carrier body into first and second regions. Advantageously, the bores defined by the carrier body open through the first region of the first surface while the index matching gel is retained within the second region of the first surface. Accordingly, the bores are free of index matching gel.

The carrier body can also include at least one groove in which index matching gel is disposed extending inwardly from the first surface of the carrier body. According to one advantageous embodiment, the groove has a predetermined depth which is selected such that the index matching gel disposed therein protrudes outwardly beyond the rib to thereby contact the fiber optic connector as a plurality of guide pins are inserted within respective apertures of the fiber optic connector.

According to another embodiment, the carrier body can define an internal reservoir for holding the index matching gel. The applicator of this embodiment can include ejection means for controllably ejecting the index matching gel from the internal reservoir to the first surface of the carrier, preferably prior to or concurrent with the insertion of the guide pins within respective apertures of the fiber optic connector.

Accordingly, the plurality of guide pins can be inserted within and retained by respective ones of the plurality of bores defined by the carrier body, such as during a factory installation operation. In addition, a predetermined amount of index matching gel can be applied to the first surface of the carrier body, also preferably during the factory installation procedure. Thus, the installing technician need not separately apply the index matching gel to the fiber optic connectors in the field. The carrier body and the guide pins can then be covered with a protective cover which protects the applicator from contaminants.

In order to prepare a fiber optic connector, including a connector assembly having a number of stacked fiber optic connectors, for interconnection, the protective cover can be removed and the plurality of guide pins can be inserted within respective ones of the plurality of apertures defined by a first fiber optic connector. At least a portion of the index matching gel is also transferred from the carrier body to the first fiber optic connector while the plurality of guide pins are inserted therein. By thereafter inserting the portions of the plurality of guide pins which extend outwardly from the first fiber optic connector in respective ones of a plurality of apertures defined by a second fiber optic connector, the first and second fiber optic connectors can be connected in a predetermined aligned relationship.

In order to further increase the efficiency with which a plurality of fiber optic connectors are connected, the alignment shell of the present invention maintains a plurality of fiber optic connectors in a predetermined aligned relationship to thereby form a connector assembly. The alignment shell includes a plurality of sidewalls forming a closed structure, such as a rectangularly-shaped structure. The closed structure defines a chamber for receiving the plurality of fiber optic connectors. According to the present invention, at least one of the sidewalls is releasably connected to a second sidewall such that the releasably connected sidewall can be opened to receive the plurality of fiber optic connectors and can be closed and, in one embodiment, latched to retain the plurality of fiber optic connectors therein. In one embodiment, the releasably connected sidewall is hingedly connected to the second sidewall.

The alignment shell can also include alignment means for maintaining the plurality of fiber optic connectors in a predetermined aligned relationship within the alignment shell while the hingedly connected sidewall is closed. In one embodiment, each of the fiber optic connectors includes a raised shoulder extending circumferentially about the connector. In this embodiment, the alignment means can include a groove defined by a pair of sidewalls for receiving the raised shoulders of the fiber optic connectors. Accordingly, the plurality of fiber optic connectors are retained within the alignment shell in the predetermined aligned relationship such that increased numbers of optical fibers can be simultaneously aligned and connected according to the present invention.

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Figure 1:
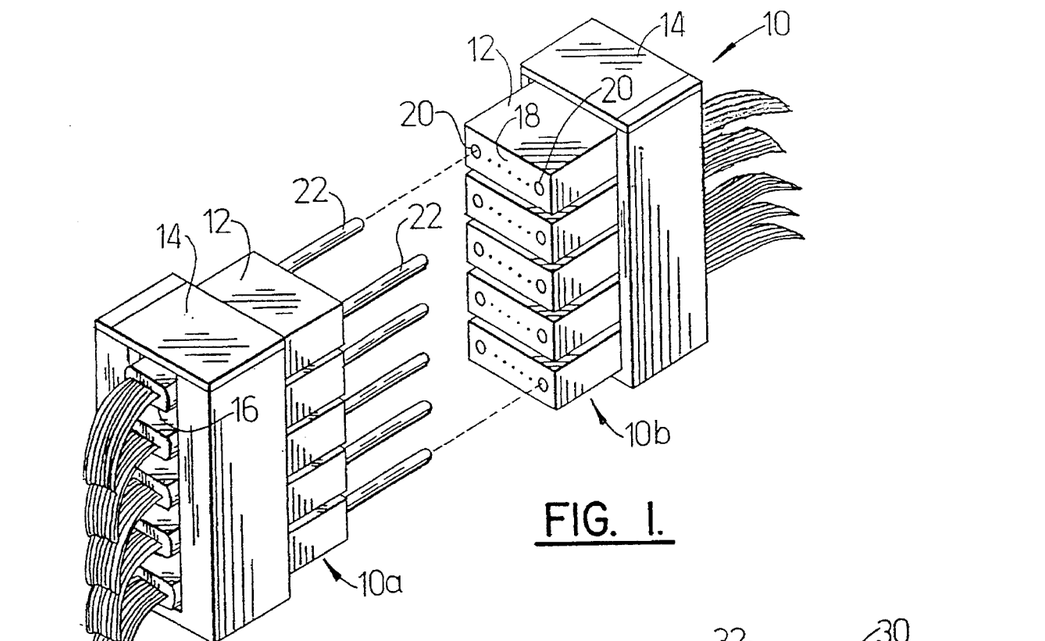
FIG. 1 is a perspective view of first and second connector assemblies immediately prior to their interconnection.

Referring now to FIG. 1, a pair of connector assemblies 10 are illustrated immediately prior to their interconnection. As shown, each of the connector assemblies includes a plurality of fiber optic connectors 12, such as MT or MF fiber optic connectors, which are maintained in a predetermined aligned relationship, such as in a stacked relationship, within an alignment shell 14 according to one embodiment of the present invention.

As known to those skilled in the art, each fiber optic connector 12 includes a rear surface 16 through which the fiber optic connector receives a fiber optic cable, such as a fiber optic ribbon cable having a number of individual optical fibers. Each fiber optic connector also includes a front or emitting surface 18 which is adapted to abut and mate with another fiber optic connector in a predetermined aligned relationship such that the individual optical fibers can be aligned with corresponding optical fibers maintained within another fiber optic connector. As used herein, the term "fiber optic connector" generally refers to both individual fiber optic connectors and connector assemblies 10 comprised of a plurality of fiber optic connectors.

As illustrated in FIG. 1, each fiber optic connector 12 includes a plurality of apertures 20 opening through its front surface 18 and adapted to receive respective guide pins 22. The guide pins are preferably inserted within the apertures defined by the fiber optic connectors of a first connector assembly 10a and, during the interconnection of the first and second connector assemblies, are inserted within corresponding apertures defined by the fiber optic connectors of a second connector assembly 10b. Accordingly, the first and second connector assemblies can be maintained in a predetermined aligned relationship.

In order to more efficiently prepare fiber optic connectors 12 for subsequent interconnection, the applicator 30 of the present invention includes a carrier body 32 defining a plurality of bores 34 opening through a first surface 36 of the carrier body. The carrier body can be comprised of polycarbonate. However, the carrier body can be comprised of a variety of other materials without departing from the spirit and scope of the present invention.

Figure 2:
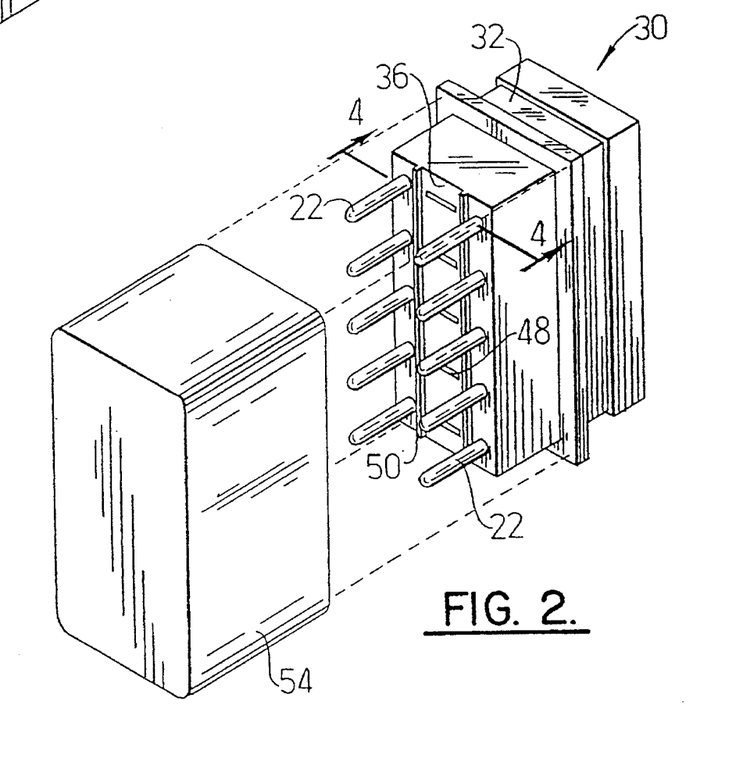
FIG. 2 is a perspective view of an applicator according to one embodiment of the present invention having the protective cover removed for purposes of illustration.
Figures 3, 4, 5:
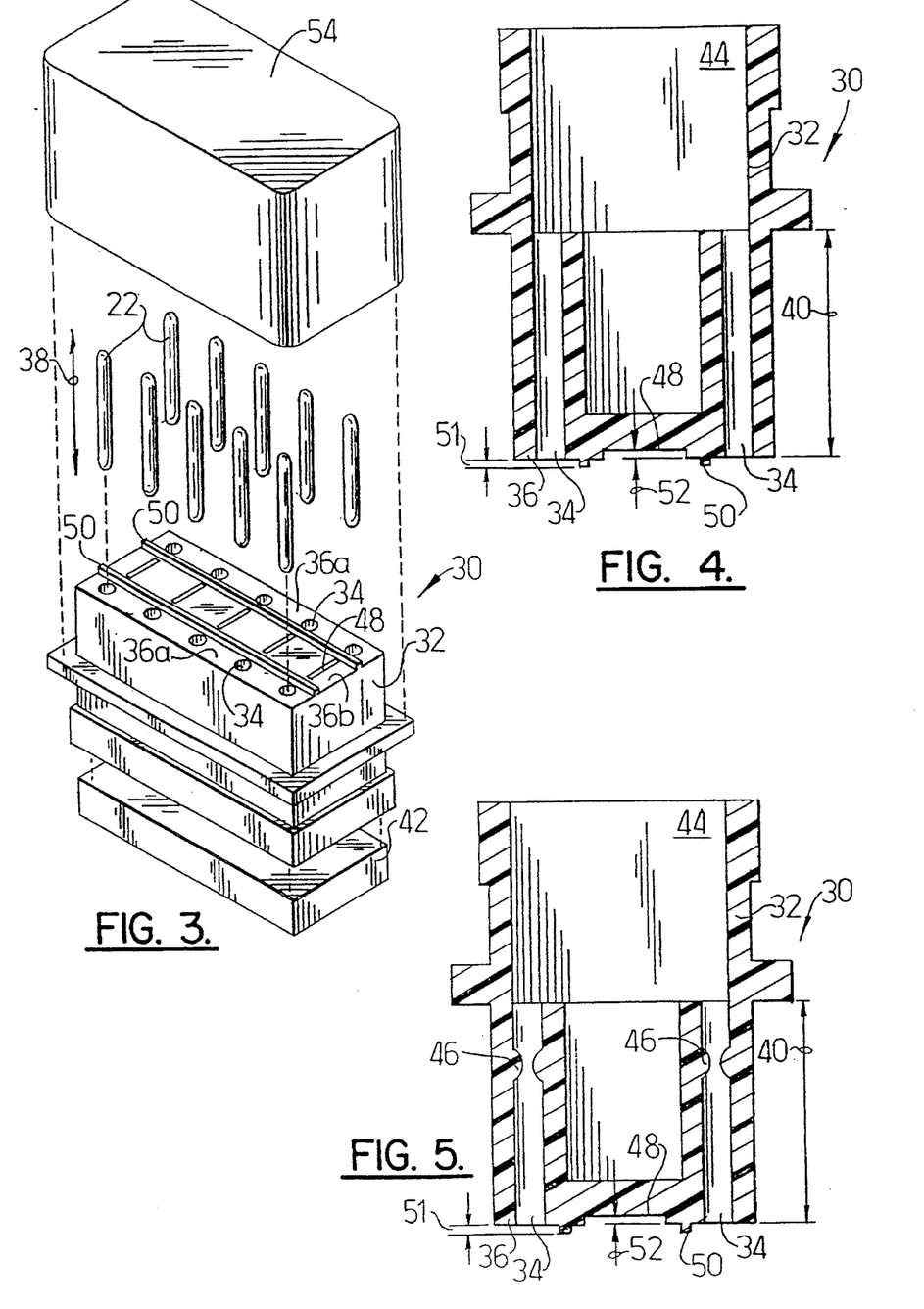
FIG. 3 is an exploded perspective view of the embodiment of the applicator illustrated in FIG. 2.
FIG. 4 is a cross-sectional view of an applicator according to one embodiment of the present invention taken along line 4—4 of FIG. 2.
FIG. 5 is a cross-sectional view of an applicator according to another embodiment of the present invention illustrating a carrier body defining bores having inwardly extending ribs for retaining respective ones of the plurality of guide pins.

As illustrated in FIGS. 2 and 3, the applicator 30 also includes a plurality of guide pins 22 disposed at least partially within respective ones of the plurality of bores 34 defined by the carrier body 32. The guide pins have a predetermined length 38, such as 11 millimeters in one exemplary embodiment, and extend from opposed first and second ends. As illustrated in cross-section in FIG. 4, the bores defined by the carrier body also have a predetermined depth 40. According to one embodiment, the predetermined depth of the bores is one-half of the predetermined length of the guide pins. Thus, in this embodiment, about one-half of the predetermined length of the guide pins is disposed within the carrier body and about one-half of the predetermined length of the guide pins extends outwardly from the first surface 36 of the carrier body.

According to one embodiment, the applicator 30 also includes means, such as a magnet 42 as shown in FIG. 3 or ribs 46 extending inwardly into the bores as shown in FIG. 5, for releasably retaining the plurality of guide pins 22 within respective ones of the plurality of bores 34 defined by the carrier body 32. The guide pins are preferably retained prior to their insertion within respective ones of the apertures 20 of the fiber optic connector 12. Upon their insertion within respective ones of the apertures defined by a fiber optic connector, the plurality of guide pins are preferably captured by the fiber optic connector and are retained within the respective apertures defined therein.

Due to the above-described preferred relationship between the predetermined length 38 of the guide pins 22 and the predetermined depth 40 of the bores 34 defined by the carrier body 32, the guide pins are preferably inserted within respective ones of the apertures defined by the fiber optic connector 12 such that about one-half of the predetermined length of the guide pins are disposed within the fiber optic connector and about one-half of the predetermined length of the guide pins extend outwardly from the fiber optic connector. However, the guide pins can be inserted to various other depths within the fiber optic connectors without departing from the spirit and scope of the present invention.

In order to effectively retain the guide pins 22 within the applicator 30 prior to their insertion in respective ones of the apertures 20 of a fiber optic connector 12, the retaining means preferably provides a predetermined retention force to the plurality of guide pins. This retention force is preferably greater than the gravitational force to which the guide pins are subjected such that the guide pins do not fall from the applicator in instances in which the applicator is inverted. However, the predetermined retention force is preferably less than the force with which the plurality of guide pins are captured by the fiber optic connector upon insertion of the plurality of guide pins into the respective ones of the apertures of the fiber optic connector. The force with which the plurality of guide pins are captured by the fiber optic connector is generally provided by frictional forces due to the snug fit of the guide pins within the respective apertures defined by the fiber optic connector. However, other means of retaining the guide pins within the fiber optic connector can be provided without departing from the spirit and scope of the present invention.

According to one embodiment, the guide pins 22 can be comprised of a ferromagnetic material, such as stainless steel. Consequently, the retaining means of this embodiment can include a magnet 42 for releasably retaining the plurality of ferromagnetic guide pins within respective ones of the plurality of bores 34 defined by the carrier body 32 by providing a predetermined retention force thereto as depicted in FIG. 3. In particular, a magnet can be disposed within a cavity 44 defined by the carrier body, such as a cavity adjacent a second surface of the carrier body, opposite the first surface, as shown in FIGS. 2–4.

According to another embodiment, the retaining means includes means for frictionally engaging the plurality of guide pins 22 to thereby retain the plurality of guide pins within respective ones of the plurality of bores 34 defined by the carrier body 32. The frictional engaging means can include a plurality of ribs 46 extending inwardly within respective ones of the plurality of bores defined by the carrier body as shown in cross-section in FIG. 5 to thereby frictionally engage and releasably retain the guide pins disposed at least partially therein. As described above, however, the frictional engagement force provided by the inwardly extending ribs is preferably less than the frictional force provided by the fiber optic connector 12 upon insertion of the guide pins into respective apertures 20 defined by the fiber optic connector. Accordingly, the guide pins will be effectively transferred from the applicator to the fiber optic connector following the insertion of the guide pins therein.

The retaining means can also include a variety of other means for maintaining the plurality of guide pins 22 within respective ones of the plurality of bores 34 defined by the carrier body 32 prior to the insertion of the guide pins within respective apertures 20 of a fiber optic connector 12. For example, the retaining means can include an elastic member extending about the respective second ends of the plurality of guide pins which are disposed within the respective bores defined by the carrier body to thereby releasably retain the plurality of guide pins within the respective bores.

According to another embodiment of the present invention, the applicator 30 can include index matching gel provided to the first surface 36 of the carrier body 32. The index matching gel is at least partially transferred to the fiber optic connector 12 as the plurality of guide pins 22 are inserted within respective ones of the apertures 20 of the fiber optic connector. In order to effectively couple a pair of fiber optic connectors, a predetermined amount of index matching gel is preferably provided to the first surface of the carrier body and is transferred to the fiber optic connector. The applicator of this embodiment can also include retaining means as described. However, the applicator of this embodiment need not include retaining means and, instead, the guide pins can be loosely fit within the respective bores 34 defined by the carrier body.

According to one embodiment of the present invention, the index matching gel is disposed upon the first surface 36 of the carrier body 32. In order to controllably retain the index matching gel upon the carrier body, the first surface of the carrier body can be textured. Alternatively, the first surface of the carrier body can include at least one groove 48 and, more preferably, a plurality of generally parallel grooves extending inwardly from the first surface of the carrier body such that index matching gel can be disposed within the grooves. As illustrated in FIGS. 2–4, the grooves can extend transversely across the carrier body. However, the grooves can be defined in other configurations without departing from the spirit and scope of the present invention. The index matching gel is generally retained within the grooves due to the viscosity and surface tension of the index matching gel.

The carrier body 32 of one embodiment can also include one or more ribs 50 extending outwardly from the first surface 36 of the carrier body by a predetermined distance 51, such as 0.25 mm above the first surface in one embodiment. As illustrated in FIGS. 2–6, the carrier body of one advantageous embodiment can include a pair of parallel ribs extending outwardly from the first surface of the carrier body to thereby define and separate the first surface of the carrier body into first and second regions 36a and 36b, respectively. In particular, the first region of the first surface of the carrier body includes those portions of the first surface laterally outside of the pair of parallel ribs. Correspondingly, the second region of the first surface of the carrier body includes that portion of the first surface between the pair of parallel ribs.

The ribs 50 also minimize direct contact between the first surface 36 of the carrier body 33 and the fiber optic connector 12 during the process of inserting the guide pins 22 within respective bores 34 defined therein, thereby protecting the fiber optic connector from inadvertent damage. Further, the ribs serve as a stop for insuring that the guide pins are inserted to a proper depth within the bores defined by the carrier body and for providing consistent application of the index matching gel to the fiber optic connector.

As also illustrated in FIGS. 2–6, the bores 34 defined by the carrier body 32 preferably open through the first region 36a of the first surface 36. In addition, the index matching gel is preferably retained within the second region 36b of the first surface such that the bores remain free of index matching gel.

As also shown in FIGS. 4 and 5, the grooves 48 have a predetermined depth 52, such as 0.20 mm. The predetermined depth is preferably selected such that the index matching gel disposed therein can protrude outwardly beyond the rib 50 so as to thereby contact the fiber optic connector 12 as the plurality of guide pins 22 are inserted within respective ones of the apertures 20 of the fiber optic connector. As described above, the index matching gel is retained within the grooves, even though the index matching gel protrudes outwardly therefrom, by the viscosity and surface tension of the index matching gel.

According to another embodiment, the carrier body 32 can include an internal reservoir for holding the index matching gel. According to this embodiment, the applicator 30 also includes ejection means for controllably ejecting the index matching gel from the internal reservoir to the first surface 36 of the carrier body. For example, the ejection means can include a plunger actuated by an assembling technician to eject index matching gel through portholes defined in the first surface of the carrier body which are in fluid communication with the internal reservoir. Preferably, the index matching gel is ejected prior to or simultaneous with the insertion of the plurality of guide pins 22 within respective ones of the apertures 20 defined by the fiber optic connector 12. In addition, a predetermined amount of index matching gel is preferably ejected and transferred to the first surface from the internal reservoir.

As illustrated in FIGS. 2 and 3, the carrier body 32 defines a plurality of bores 34 according to a predetermined pattern. The predetermined pattern corresponds to the relative positions of the apertures 20 defined by the fiber optic connector 12. In particular, the carrier body maintains the guide pins 22 in a precise, aligned relationship relative to the apertures defined by the fiber optic carrier. Thus, the installing technician need not attempt to individually position and insert each guide pin in its respective aperture.

The plurality of guide pins 22 are aligned with and can be inserted, typically simultaneously, within respective ones of the apertures 20 of the fiber optic connector 12. In one embodiment illustrated in FIGS. 2 and 3, the predetermined pattern defined by the plurality of bores is two-dimensional. Thus, the applicator 30 of this embodiment can insert guide pins into corresponding apertures defined by the plurality of stacked fiber optic connectors of a connector assembly 10 as illustrated in FIG. 6.

Figure 7:
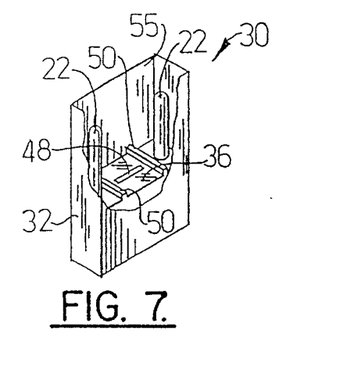
FIG. 7 is a perspective view of an applicator according to another embodiment of the present invention which is adapted to insert a pair of guide pins in the respective apertures of a single fiber optic connector and having the protective cover removed for clarity.

Alternatively, the carrier body 32 can define a pair of laterally-opposed bores 34 for inserting a pair of guide pins 22 into the respective apertures 20 of a single fiber optic connector 12 as shown in FIG. 7. As also illustrated in FIG. 7, the applicator 30 can include an alignment shroud 55 sized and shaped so as to receive the fiber optic connector in a predetermined aligned manner such that the guide pins are inserted within the respective apertures of the fiber optic connector. While the applicator having a two-dimensional arrangement of bores is not shown in FIGS. 2 and 3 as having an alignment shroud, this embodiment of the applicator can also include an alignment shroud if desired without departing from the spirit and scope of the present invention.

As illustrated in FIGS. 2 and 3, the applicator 30 can also include a protective cover 54 removably mounted to the carrier body 32. The protective cover is adapted to protect the applicator and, in particular, the guide pins 22 and the index matching gel from contaminants or other undesirable environmental effects. Accordingly, the protective cover defines an internal cavity in which the portions of the plurality of guide pins which extend outwardly from the first surface 36 of the carrier body are disposed.

Figure 6:
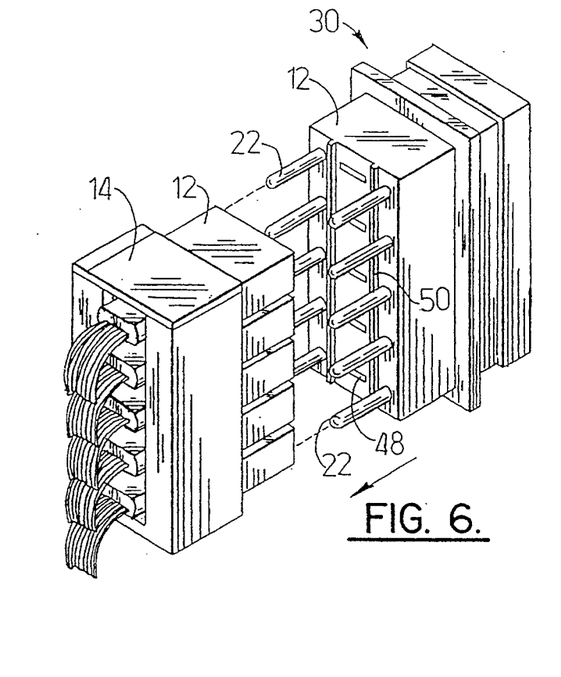
FIG. 6 is a perspective view of an applicator according to one embodiment of the present invention illustrating the insertion of the plurality of guide pins in respective ones of the plurality of apertures defined by the fiber optic connectors of a connector assembly.

In order to simultaneously couple a plurality of fiber optic connectors 12, the present invention also provides an alignment shell 14 for maintaining the plurality of fiber optic connectors in the predetermined aligned relationship, thereby forming a connector assembly 10 as illustrated in FIGS. 1 and 6. While the plurality of fiber optic connectors are maintained in a closely packed, stacked relationship in the embodiment illustrated in FIGS. 1 and 6, the fiber optic connectors need not be closely packed, but could be maintained in a spaced apart relationship by the alignment shell of the present invention. In this embodiment, the spacing between the fiber optic connectors can be controllably varied if desired. In addition, the fiber optic connectors need not be stacked in a vertically aligned relationship, but could be maintained in a variety of predetermined positional relationships, including a laterally staggered relationship.

The alignment shell 14 includes a plurality of sidewalls 56 forming a closed structure. As illustrated in FIGS. 1 and 6 and, in more detail, in FIG. 8, the plurality of sidewalls can form a rectangularly-shaped structure. The sidewalls also define a chamber for receiving a plurality of fiber optic connectors 12. In addition, the rear and front surfaces of the alignment shell define respective openings such that the rear and front surfaces of the fiber optic connectors are thereby exposed.

Figures 8, 9:
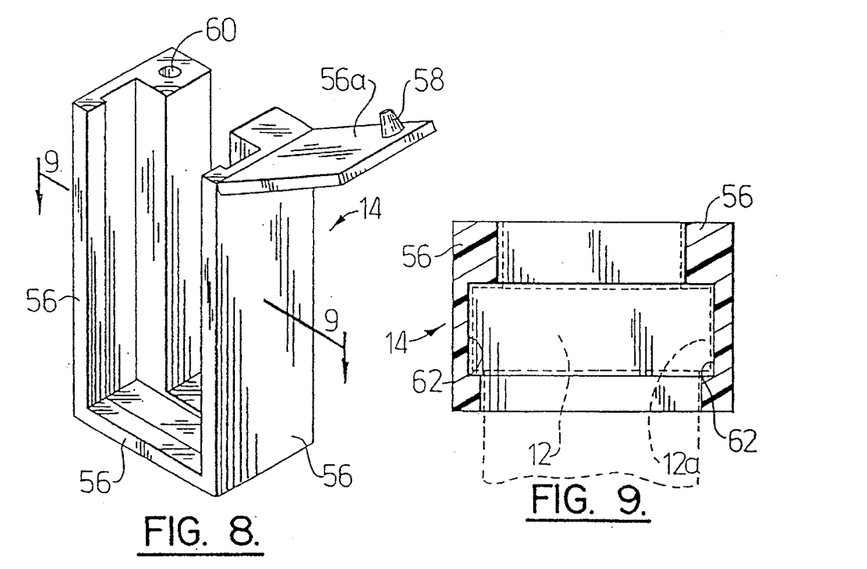
FIG. 8 is a perspective view of an alignment shell according to one embodiment of the present invention with the hingedly connected sidewall opened.
FIG. 9 is a cross-sectional view of an alignment shell according to one embodiment of the present invention taken along line 9—9 of FIG. 8 with a fiber optic connector shown in dashed lines for purposes of illustration.

According to the present invention, at least one of the sidewalls 56a is releasably connected to a second sidewall 56. In one advantageous embodiment, the releasably connected sidewall is hingedly connected to the second sidewall such that the hingedly connected sidewall can be opened to receive the plurality of fiber optic connectors 12 and can be closed to retain the plurality of fiber optic connectors therein. In addition, the alignment shell 14 can include latch means for latching the hingedly connected sidewall to an adjacent sidewall to thereby retain the plurality of fiber optic connectors therein. For example, the hingedly connected sidewall can include an outwardly projecting dimple 58 and the adjacent sidewall can define a respective recess 60 for receiving the dimple and releasably retaining the hingedly connected sidewall in a closed position, typically by frictional forces between the dimple and the interior walls of the recess.

The alignment shell 14 can also include alignment means for retaining the plurality of fiber optic connectors 10 in the predetermined aligned relationship within the alignment shell while the hingedly connected sidewall 56a is closed. As shown by dashed lines in FIG. 9, each of the fiber optic connectors can include a raised shoulder 12a extending circumferentially thereabout and between the opposed rear and front surfaces 16 and 18. In this embodiment, the alignment means can include an inwardly facing groove 62 defined by a pair of the sidewalls 56 and opening into the chamber as defined by the sidewalls for receiving the raised shoulders of the fiber optic connectors. Thus, the plurality of fiber optic connectors are retained in predetermined aligned relationship within the alignment shell of the present invention.

Accordingly, the connector assembly 10 comprised of the plurality of stacked fiber optic connectors 12 can be simultaneously mated with a second connector assembly in a predetermined aligned relationship, as shown in FIG. 1, such that the individual optical fibers retained by the fiber optic connectors are efficiently coupled. Once the connector assemblies have been mated, the hingedly connected sidewalls 56a of the alignment shells 14 of the connector assemblies can be opened and the individually connected fiber optic connectors removed therefrom if desired.

According to the present invention, the plurality of guide pins 22 can be inserted at least partially within respective ones of the plurality of bores 34 defined by the carrier body 32 of the applicator 30. The insertion of the plurality of guide pins can be performed during a factory fabrication process such that a technician need no longer individually insert the guide pins into respective apertures 20 of the fiber optic connectors 12 in the field. In addition, index matching gel can be applied to the first surface 36 of the carrier body. Preferably, a predetermined amount of index matching gel is applied to the first surface of the carrier body during a factory fabrication process such that the technician need no longer attempt to individually apply a predetermined amount of index to the fiber optic connector. The applicator can then be covered with a protective cover 54 to protect the guide pins and index matching gel from contamination and damage during shipment and storage.

Once in the field, the plurality of guide pins 22 maintained in a predetermined arrangement by the applicator 30 can be simultaneously inserted within respective ones of the plurality of apertures 20 defined by a first fiber optic connector 12 such that the plurality of guide pins are retained by the first fiber optic connector and extend outwardly therefrom. The guide pins are typically inserted within the apertures defined by the first fiber optic connector in a manual operation by an installing technician. However, the technician can employ an insertion fixture which receives and holds both the applicator and the first fiber optic connector and which controllably inserts the guide pins within respective apertures defined by the first fiber optic connector.

While the guide pins 22 are inserted within respective apertures 20 defined by the first fiber optic connector 12, at least a portion of the index matching gel is also transferred from the first surface 36 of the carrier body 32 to the first fiber optic connector. Thereafter, the portions of the plurality of guide pins which extend outwardly from the first fiber optic connector can be inserted in respective ones of a plurality of apertures defined by a second fiber optic connector. Thus, the first and second fiber optic connectors can be connected in a predetermined aligned relationship.

As illustrated in FIG. 6, the above-described preparation and assembly process can be applied to simultaneously insert guide pins 22 and apply index matching gel to the plurality of fiber optic connectors 12 of a connector assembly 10. As also described above, the plurality of fiber optic connectors of a connector assembly are preferably maintained in a predetermined positioned relationship by the alignment shell 14 of the present invention. Thus, connector assemblies can be readily interconnected, thereby coupling large numbers of optical fibers.

In the drawings and the specification, there has been set forth preferred embodiments of the invention and, although specific terms are employed, the terms are used in a generic and descriptive sense only and not for the purpose of limitation, the scope of the invention being set forth in the following claims.

That which is claimed is:

1. An applicator for inserting guide pins in corresponding apertures of a fiber optic connector, the applicator comprising:

a carrier body defining a plurality of bores opening through a first surface of said carrier body;

a plurality of guide pins disposed at least partially within respective ones of said plurality of bores defined by said carrier body, said guide pins extending outwardly from the first surface of said carrier body and wherein said plurality of bores are located according to a predetermined pattern which corresponds to the relative positions of the apertures defined by the fiber optic connector such that said plurality of guide pins are aligned with and can be simultaneously inserted within respective ones of the apertures of the fiber optic connector; and means for releasably retaining said plurality of guide pins within respective ones of said plurality of bores defined by said carrier body prior to inserting said plurality of guide pins within respective ones of the apertures of the fiber optic connector.

2. An applicator according to claim 1 further comprising index matching gel disposed on the first surface of said carrier body such that said index matching gel is at least partially transferred to the fiber optic connector as said plurality of guide pins are inserted within respective ones of the apertures of the fiber optic connector.

3. An applicator according to claim 2 wherein said carrier body comprises at least one rib extending outwardly from the first surface of said carrier body to thereby minimize contact between said carrier body and the fiber optic connector while inserting said guide pins therein.

4. An applicator according to claim 2 wherein said carrier body comprises at least one groove extending inwardly from the first surface of said carrier body such that said index matching gel can be disposed within said groove.

5. An applicator according to claim 1 wherein said retaining means provides a predetermined retention force to said plurality of guide pins, and wherein the predetermined retention force is less than the force with which said plurality of guide pins are captured by the fiber optic connector upon insertion of said plurality of guide pins into respective ones of the apertures of the fiber optic connector.

6. An applicator according to claim 1 wherein said plurality of guide pins are comprised of a ferromagnetic material, and wherein said retaining means comprises a magnet for retaining said plurality of ferromagnetic guide pins within respective ones of said plurality of bores defined by said carrier body.

7. An applicator according to claim 1 wherein each guide pin extends from a first end which extends outwardly from the first surface of said carrier body to a second end disposed within a respective bore defined by said carrier body, and wherein said retaining means comprises an elastic member extending about the respective second ends of said plurality of guide pins to thereby retain said plurality of guide pins within respective ones of said plurality of bores defined by said carrier body.

8. An applicator according to claim 1 wherein said retaining means comprises a plurality of ribs extending inwardly into respective ones of the plurality of bores defined by said carrier body to thereby frictionally engage and retain said plurality of guide pins disposed at least partially therein.

9. An applicator according to claim 1 further comprising a protective cover removably mounted to said carrier body to thereby by define an internal cavity in which the portions of said plurality of guide pins which extend outwardly from the first surface of said carrier body are disposed.

10. An applicator for inserting guide pins in corresponding apertures of a fiber optic connector, the applicator comprising:

a carrier body defining a plurality of bores opening through a first surface of said carrier body;

a plurality of guide pins disposed at least partially within respective ones of said plurality of bores defined by said carrier body, said guide pins extending outwardly from the first surface of said carrier body and wherein said plurality of bores are located according to a predetermined pattern which corresponds to the relative positions of the apertures defined by the fiber optic connector such that said plurality of guide pins are aligned with and can be simultaneously inserted within respective ones of the apertures of the fiber optic connector; and index matching gel provided to the first surface of said carrier body such that said index matching gel is at least partially transferred to the fiber optic connector as said plurality of guide pins are inserted within respective ones of the apertures of the fiber optic connector.

11. An applicator according to claim 10 further comprising means for releasably retaining said plurality of guide pins within respective ones of said plurality of bores defined by said carrier body prior to inserting said plurality of guide pins within respective ones of the apertures of the fiber optic connector.

12. An applicator according to claim 11 wherein said retaining means provides a predetermined retention force to said plurality of guide pins, and wherein the predetermined retention force is less than the force with which said plurality of guide pins are captured by the fiber optic connector upon insertion of said plurality of guide pins into respective ones of the apertures of the fiber optic connector.

13. An applicator according to claim 11 wherein said plurality of guide pins are comprised of a ferromagnetic material, and wherein said retaining means comprises a magnet for retaining said plurality of ferromagnetic guide pins within respective ones of said plurality of bores defined by said carrier body.

14. An applicator according to claim 10 wherein said carrier body comprises at least one rib extending outwardly from the first surface of said carrier body to thereby minimize contact between said carrier body and the fiber optic connector while inserting said guide pins therein.

15. An applicator according to claim 14 wherein said carrier body comprises at least one groove extending inwardly from the second region of the first surface of said carrier body such that said index matching gel can be disposed within said groove.

16. An applicator according to claim 10 further comprising a protective cover removably mounted to said carrier body to thereby by define an internal cavity in which the portions of said plurality of guide pins which extend outwardly from the first surface of said carrier body are disposed.

17. An alignment shell for maintaining a plurality of fiber optic connectors in a predetermined aligned relationship, wherein each of the fiber optic connectors has opposed first and second surfaces for receiving at least one optical fiber and for mating with another fiber optic connector, respectively, the alignment shell comprising:

a plurality of sidewalls forming a closed structure and defining a chamber therein for receiving the plurality of fiber optic connectors, wherein at least one of the sidewalls is releasably connected to a second sidewall such that the releasably connected sidewall can be opened to receive the plurality of fiber optic connectors and can be closed to retain the plurality of fiber optic connectors therein;

rear and front surfaces defining respective openings extending therethrough to the chamber defined by said sidewalls so as to thereby expose the rear and front surface of the fiber optic connectors, respectively; and alignment means for retaining the plurality of fiber optic connectors in the predetermined aligned relationship within the alignment shell while the releasably connected sidewall is closed.

18. An alignment shell according to claim 17 further comprising latch means for latching the hingedly connected sidewall to an adjacent sidewall to thereby retain the plurality of fiber optic connectors therein.

19. A method according to claim 18 further comprising the step of releasably retaining the plurality of guide pins within respective ones of the plurality of bores defined by the carrier body following said step of inserting the plurality of guide pins therein.

20. A method according to claim 19 wherein the plurality of guide pins are comprised of a ferromagnetic material, and wherein said releasably retaining step comprises the step of magnetically retaining the plurality of guide pins within respective ones of the plurality of bores defined by the carrier body.

21. A method according to claim 19 wherein the guide pins are releasably retained with a predetermined retention force, and wherein said first inserting step comprises the step of retaining the guide pins within the respective apertures defined by the first fiber optic connector with a force which exceeds the predetermined retention force such that the plurality of guide pins are captured by the first fiber optic connector.

22. An alignment shell according to claim 17 wherein each of the fiber optic connectors also has a raised shoulder extending circumferentially thereabout between the opposed rear and front surfaces, and wherein said alignment means comprises an inwardly facing groove defined by a pair of said sidewalls and opening into the chamber defined by said sidewalls for receiving the raised shoulders of the fiber optic connectors such that the plurality of fiber optic connectors are retained in the predetermined aligned relationship.

23. An alignment shell according to claim 17 wherein said releasably connected sidewall is hingedly connected to the second sidewall.

24. A method of connecting first and second fiber optic connectors in a predetermined aligned relationship, the method comprising the steps of:

inserting a plurality of guide pins at least partially within respective ones of a plurality of bores defined in a carrier body, wherein the plurality of bores open through a first surface of the carrier body such that the plurality of guide pins extends outwardly from the first surface of the carrier body;

applying index matching gel to the first surface of the carrier body;

inserting the plurality of guide pins within respective ones of a plurality of apertures defined by the first fiber optic connector such that the plurality of guide pins are retained by the first fiber optic connector and extend outwardly therefrom;

transferring at least a portion of the index matching gel from the first surface of the carrier body to the first fiber optic connector while the plurality of guide pins are inserted therein; and     inserting the portions of the plurality of guide pins extending outwardly from the first fiber optic connector in respective ones of a plurality of apertures defined by the second fiber optic connector such that the first and second fiber optic connectors are connected in the predetermined aligned relationship.

25. A method according to claim 24 wherein a plurality of first fiber optic connectors are connected to a plurality of second fiber optic connectors, wherein said first inserting step comprises the step of inserting the plurality of guide pins within respective ones of a plurality of apertures defined by the plurality of first fiber optic connectors, and wherein said step of inserting the guide pins extending outwardly from the first fiber optic connector in respective apertures defined by the second fiber optic connector comprises the step of inserting the portions of the plurality of guide pins extending outwardly from the plurality of first fiber optic connectors in respective ones of a plurality of apertures defined by the plurality of second fiber optic connectors such that the plurality of first and second fiber optic connectors are connected in the predetermined aligned relationship.

\* \* \* \* \*